July 16, 1968 L. G. SCHOWALTER 3,392,418
DRY FOAM TYPE CARPET SHAMPOOING MACHINE
Filed Aug. 8, 1966 8 Sheets-Sheet 1

INVENTOR
LEWIS G. SCHOWALTER

July 16, 1968  L. G. SCHOWALTER  3,392,418
DRY FOAM TYPE CARPET SHAMPOOING MACHINE
Filed Aug. 8, 1966  8 Sheets-Sheet
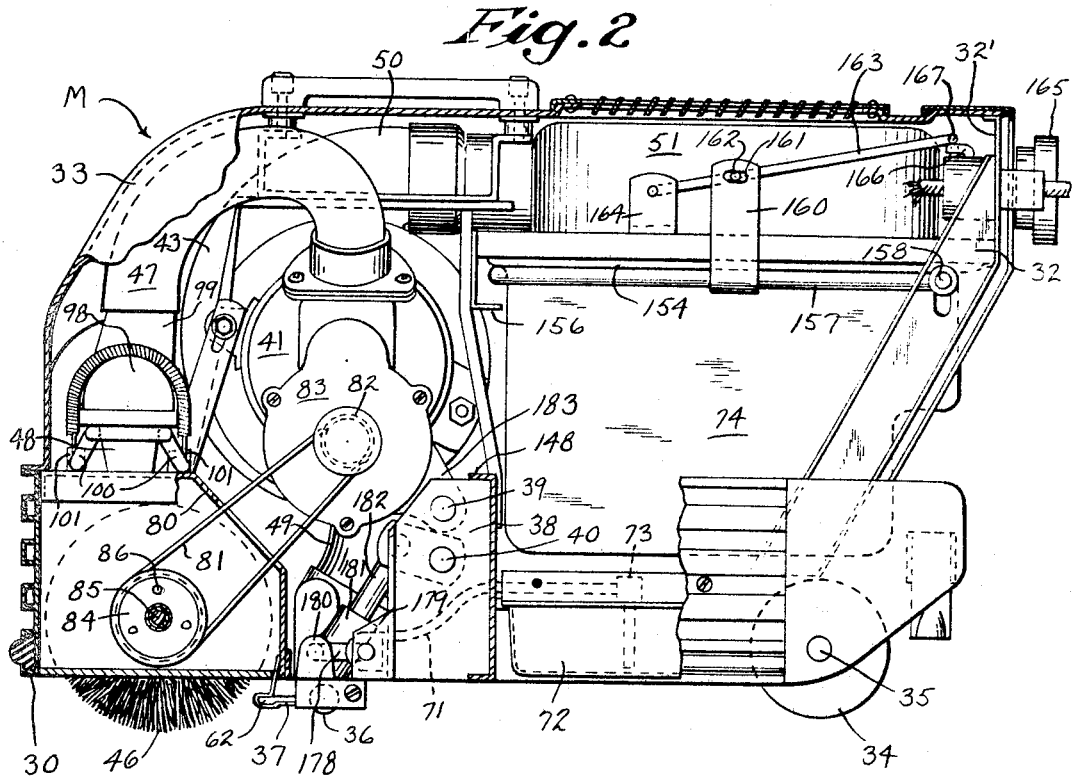
INVENTOR
LEWIS G. SCHOWALTER July 16, 1968      L. G. SCHOWALTER      3,392,418
DRY FOAM TYPE CARPET SHAMPOOING MACHINE
Filed Aug. 8, 1966      8 Sheets-Sheet 3
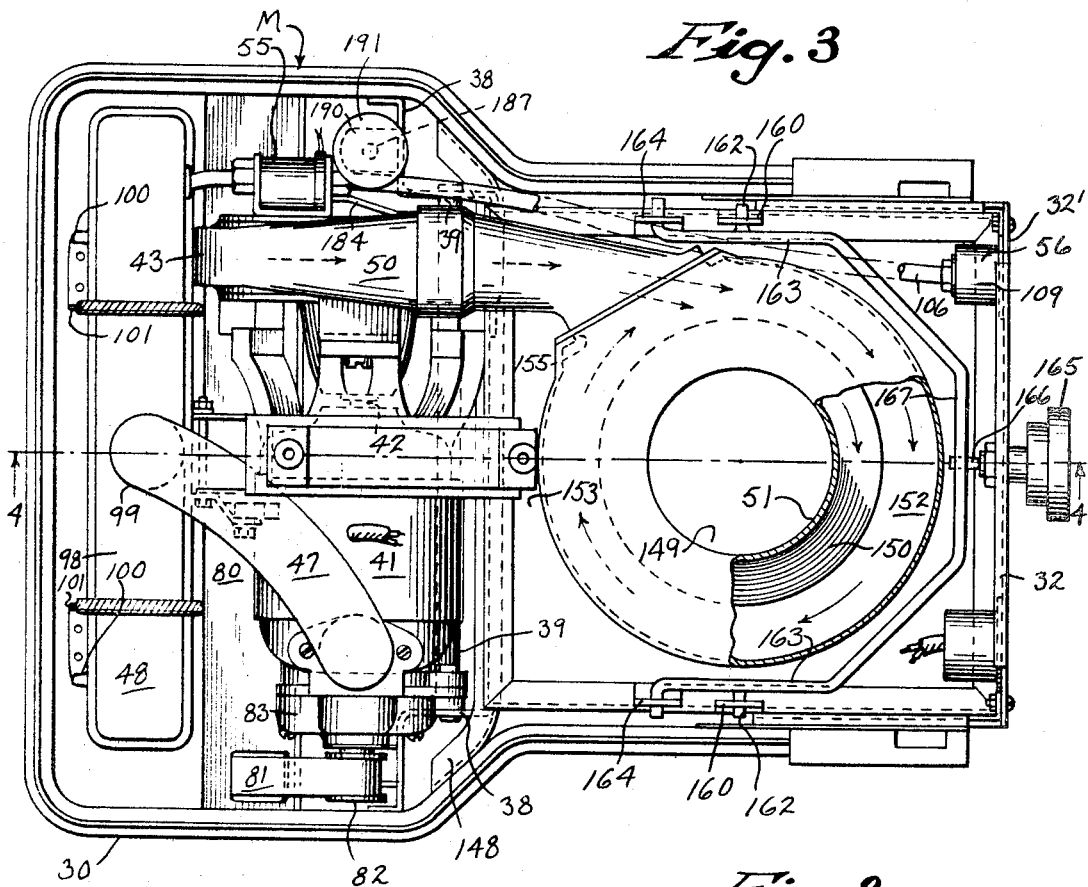
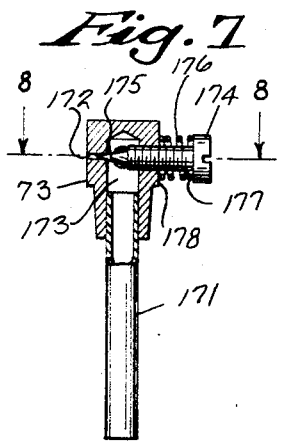
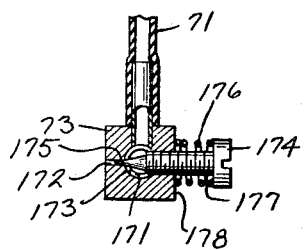
INVENTOR
LEWIS G. SCHOWALTER July 16, 1968　　　L. G. SCHOWALTER　　　3,392,418
DRY FOAM TYPE CARPET SHAMPOOING MACHINE
Filed Aug. 8, 1966　　　　　　　　　　　　　　8 Sheets-Sheet 4

Fig. 4

INVENTOR
LEWIS G. SCHOWALTER

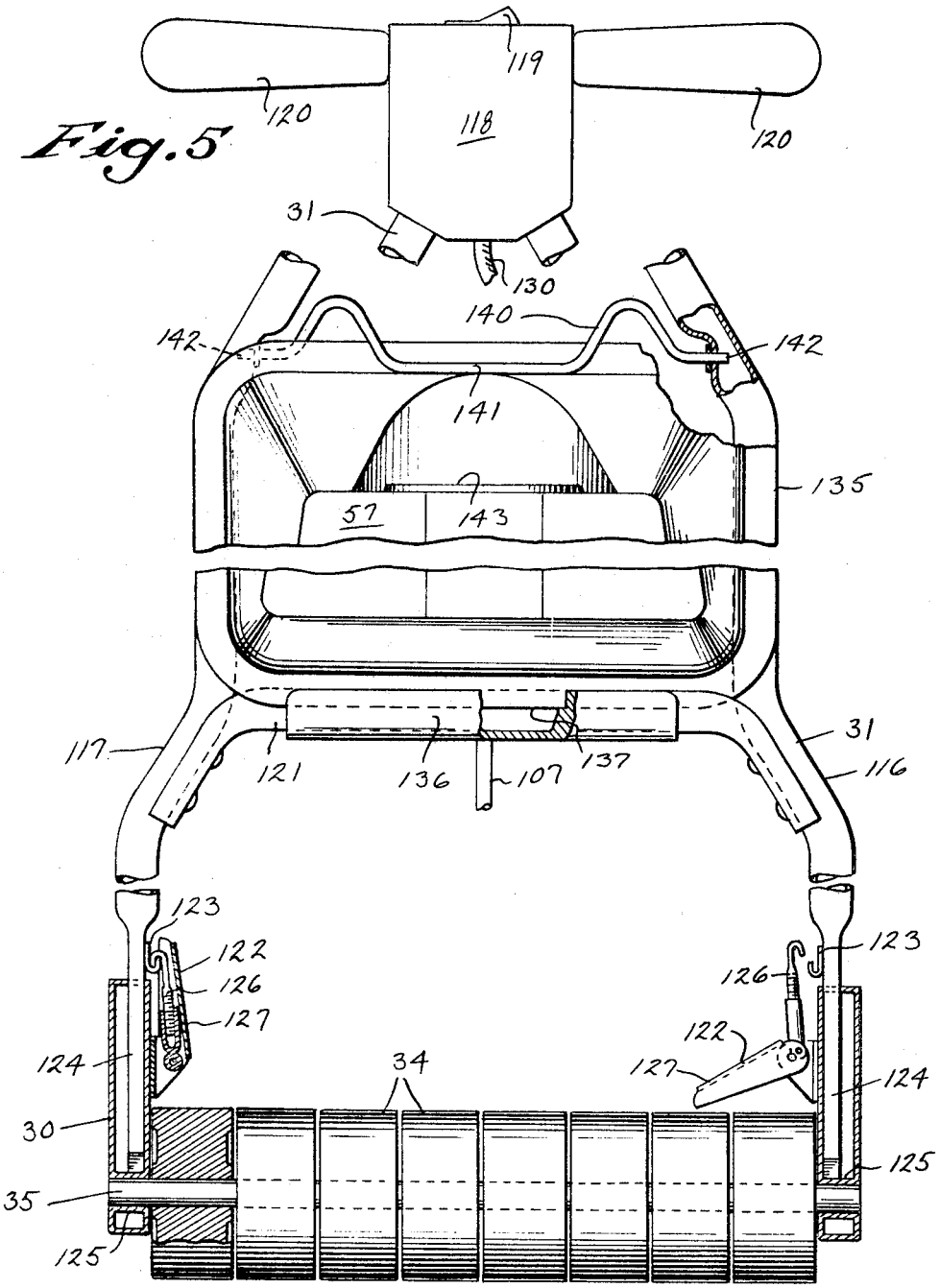

July 16, 1968  L. G. SCHOWALTER  3,392,418
DRY FOAM TYPE CARPET SHAMPOOING MACHINE
Filed Aug. 8, 1966  8 Sheets-Sheet 6

INVENTOR
LEWIS G. SCHOWALTER

INVENTOR
LEWIS G. SCHOWALTER

July 16, 1968  L. G. SCHOWALTER  3,392,418
DRY FOAM TYPE CARPET SHAMPOOING MACHINE
Filed Aug. 8, 1966  8 Sheets-Sheet 8
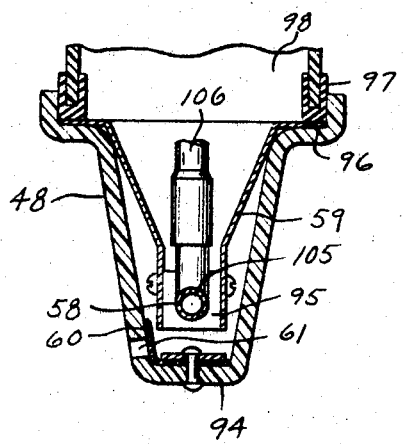
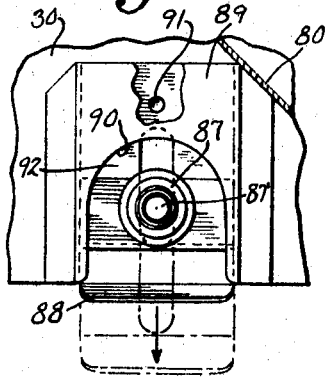
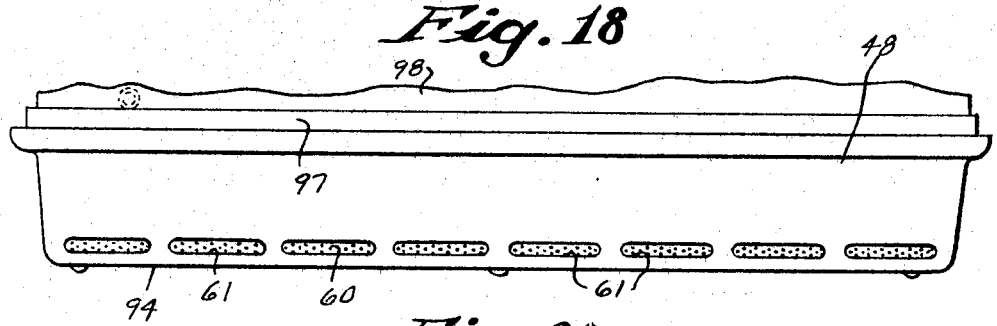
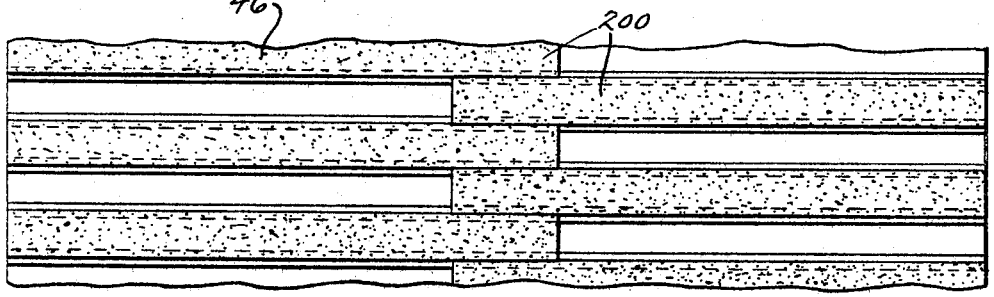
INVENTOR
LEWIS G. SCHOWALTER

United States Patent Office 3,392,418
Patented July 16, 1968

3,392,418
DRY FOAM TYPE CARPET
SHAMPOOING MACHINE
Lewis G. Schowalter, Racine, Wis., assignor to Von Schrader Manufacturing Company, Racine, Wis.
Filed Aug. 8, 1966, Ser. No. 574,878
12 Claims. (Cl. 15—320)

ABSTRACT OF THE DISCLOSURE

A carpet shampooing machine having means for producing a dry foam by mixing liquid detergent and air which is then deposited and worked into the carpet by a rotary brush revolving about a horizontal axis. A vacuum nozzle and a roller squeegee are provided for picking up the dirty solution and leaving the carpet in a comparatively dry condition.

---

This invention appertains to carpet cleaning and more particularly to new and useful improvements in a foam type carpet shampooing machine.

There are on the market many types of carpet cleaning machines and many ways and systems for cleaning carpets. One of the ways of cleaning carpets is by generating a foam and then scrubbing the foamed carpet, usually by a brush means, and then vacuuming the foam and directing the same to a dirty liquid container. All known prior machines of the foam type have been unsatisfactory in that, either they were too complicated and expensive to manufacture and repair, or they failed to lay down an even foam, causing an uneven wetting of the carpet and an inefficient cleaning of the same.

It is, therefore, a primary object of the present invention to provide a carpet cleaning machine of the so-called foam type which lays down an even layer of foam and in which the foam itself is of a uniform consistency, and which when vacuumed from the carpet leaves the carpet in a substantially dry and uniform condition.

An important object of the present invention is to provide a foam type carpet shampooing machine wherein the foam is directed in front of a rotating brush so that the direction of rotation of the brush will move and deposit the foam evenly in front of the machine and scrub the carpet clean and wherein a vacuum nozzle located to the rear of the rotating brush will effectively remove all of the foam from the carpet and leave a substantially dry and clean surface.

A further object of the present invention is to provide novel means associated with the vacuum nozzle which will effectively act as a squeegee to remove the deep lined dirt and foam in the pile of the carpet and will also prevent the pulling of the carpet to seal the vacuum nozzle, and prevent the lifting of the carpet adjacent the rotating brush.

A salient feature of the present invention resides in the provision of a new and improved foam generating mechanism which mixes air uniformly with the detergent and forms a foam of uniform moisture content and consistency, thus avoiding wet spots on the carpet and which aids materially in spreading the foam uniformly in front of the machine.

Another object of the present invention is to provide a foam type carpet shampooing machine wherein the working parts of the machine are mounted on a single substantially U-shaped outer ornamental frame member, the frame member also carrying the cover, handle and other working parts of the machine to give a relatively simple, practical and reliable construction that allows the machine to be economically manufactured and easily assembled.

Still another object of the present invention is to provide a novel defoaming means which will quickly and readily change the suds and foam back to liquid, and which involves a new and improved defoaming or snifter valve to regulate the exact amount of defoaming agent to be mixed with the dirty suds, and wherein the defoaming agent is injected into the foam immediately adjacent the vacuum nozzle at a point just above the squeegee roller and vacuum throat entrance.

A further object of the present invention is to provide an electric motor conveniently located in the machine which is utilized not only to rotate the scrubbing brush but also to operate the vacuum fan for withdrawing the dirty suds from the carpet and also to operate a fan to inject air into the foaming mechanism for making the foam, as well as providing for the cooling of the motor.

A still further object of the present invention is to provide an improved rear frame structure carrying a panel to which the various plugs and connections for the electric energy, as well as the entrance of the detergent solution to the foam device, are conveniently carried in a compact and novel manner. This provides in particular a quick attaching and detaching coupling for the detergent.

Another object of the present invention is to provide a novel squeegee shoe adjacent the lip of the vacuum nozzle throat which prevents the sucking of the foam from the brush before the foam is presented to the carpet and properly used to clean the same. This squeegee shoe is also located adjacent the squeegee roller.

A more specific object of the present invention resides in providing a portable machine employing a unique method of shampooing carpeting which includes a detergent solution carried in a tank mounted on a detachable operating handle (the detergent solution flowing down a tube through a novel coupling device and through an electrically controlled solenoid valve) and wherein the detergent solution is fed into a special device where it is mixed with air and transformed into a foam. The foam is then applied to a rotating brush; the scrubbing action of the brush on the carpet loosens the dirt and the dirt is then captured by the foam. A vacuum nozzle located directly behind the brush then sucks the dirty foam out of the carpet and this dirty foam is mixed with a defoaming solution which turns it back into a liquid. The liquid then is separated from the air and stored in a conveniently located dirty suds tank. This operation is done in a continuous process as the machine moves across the carpet.

Still another object of my present invention is to provide a novel means for separating the air from the dirty liquid. This separator is in the shape of a cone for imparting a rotating motion to the liquid and allowing the liquid to drop into a dirty liquid container and the air to move outwardly from the machine.

Still another object of my present invention is to provide novel adjustment means for the various working parts of the machine so that the height of the brush in relation to the carpet can be adjusted for example, and also the height of the vacuum nozzle, squeegee roller and other fine adjustments made.

A further object of the present invention is to provide means whereby the various parts can be quickly and easily removed from the machine, such as the handle, the detergent holding tank, the dirty suds tank, the foam generator and the defoaming agent container. All these parts are associated with the machine in a novel manner.

A further object of the present invention is to provide a lower unitary member carrying the working parts of the machine, which is in turn supported by the front rotating brush, squeegee roller, and a series of independently mounted rear rollers, the rear rollers extending transversely across the rear of the machine, and independently mounted as stated, so that the machine can be readily and easily turned without a drag on any portion of the rear rollers.

A still further object of the present invention is to provide a portable foam type carpet shampooing machine of an attractive, ornamental appearance, and of a comparatively reasonable size, and one which can be placed upon the market at a reasonable cost and which will be durable and efficient in use, and which will go over a spot on the carpet several times without unevenly spotting or wetting the same.

With the above and other objects in view, which will more readily appear as the nature of the invention is better understood, the same consists in the novel method, construction, combination and arrangement of parts, hereinafter more fully described, illustrated and claimed.

One preferred and practical embodiment of the invention is shown in the accompanying drawings, in which FIGURE 1 is a side elevational view of the machine in its operative position with parts being broken away and in section to illustrate details in its constructon;

FIGURE 2 is a side elevational view of the machine with the handle removed, with certain parts of the frame and cover broken away to expose the inner moving parts of the same;

FIGURE 3 is a top plan view of the machine with the handle and cover removed and certain parts being broken away and in section to illustrate further details in its construction;

FIGURE 4 is a longitudinal section taken through the machine, the section being on the line 4—4 of FIGURE 3 of the drawings and looking in the direction of the arrows;

FIGURE 5 is a transverse substantially vertical sectional view taken substantially on the line 5—5 of FIGURE 1 of the drawings, looking in the direction of the arrows and with certain parts being broken away and in section;

FIGURE 6 is a fragmentary transverse section through the upper part of the machine, the section being taken on the line 6—6 of FIGURE 4 of the drawings, and illustrating in particular the cyclone or conical type separator;

FIGURE 7 is a fragmentary detail section taken through the defoamer or snifter valve, the section being taken on the line 7—7 of FIGURE 4 of the drawings, and looking in the direction of the arrows;

FIGURE 8 is a fragmentary horizontal transverse section through the snifter valve shown in FIGURE 7, the section being taken on the line 8—8 of FIGURE 7 and looking in the direction of the arrows;

FIGURE 17 is an enlarged vertical transverse section taken through the foam generating mechanism;

FIGURE 18 is a fragmentary front elevational view of the foam generating mechanism;

FIGURE 19 is a side elevational view of the adjustable mounting means for the rotating brush, the view being represented by the line 19—19 of FIGURE 14 of the drawings, and looking in the direction of the arrows, and FIGURE 20 is a fragmentary detail view of one way of constructing the rotating scrubbing brush.

Figure 1:
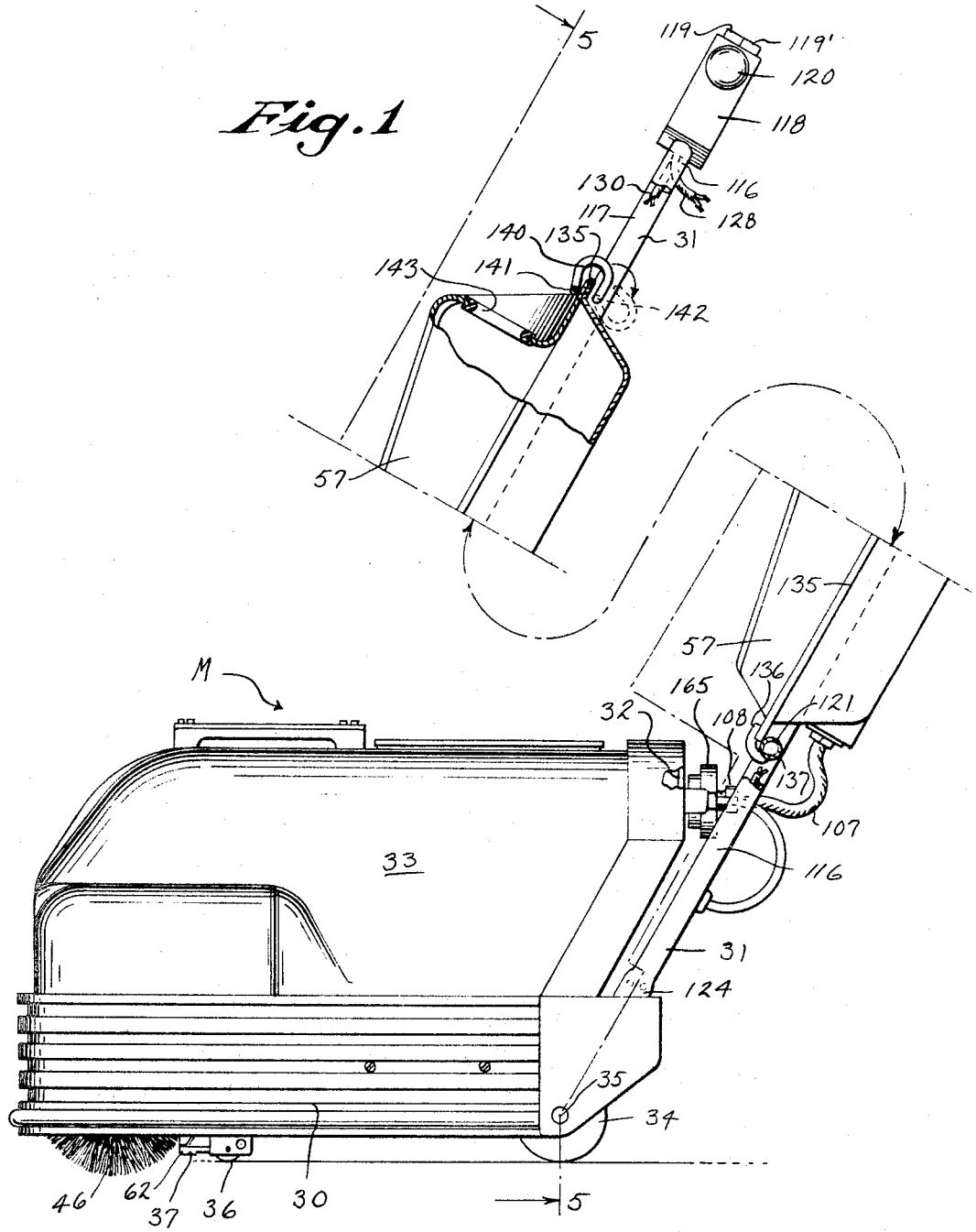

The method of operation of this invention will be clearer understood by referring to the drawings (forming a part of the present specification) wherein like reference characters designate the same or similar parts throughout the several views, and the letter M generally indicates one type of the portable foam generating carpet scrubbing machine. The machine includes broadly a unique ornamental lower frame member 30 carrying and supporting the working parts of the machine, a removable handle 31, rear frame bracket and panel support member 32 and the removable cover 33.

The lower ornamental frame 30 is of a generally unitary structure, U-shaped, as shown more particularly in FIGURE 3 of the drawings. The forward portion of the frame is of a slightly larger area than the rear portion and carries and supports the motor, vacuum nozzle squeegee, rotary brush and the foam generating mechanism, while the rear portion in conjunction with the brace member 32 carries the cyclone separator, the dirty liquid tank and the defoaming agent tank. This novel ornamental lower frame 30, therefore, forms the main support for carrying the aforementioned working parts, and is in turn, primarily supported by a transversely extending series of rollers 34 (note FIGS. 2 and 5). These rollers are independently mounted and rotate independent of one another on shaft 35 which in turn is journaled adjacent the rear of the unitary ornamental frame 30, as shown. Thus, it is readily apparent that as the machine moves along the carpet, it can be easily turned and each roller will rotate at a different sped to compensate for the turning of the machine and eliminates any drag that might occur if a solid roller were provided. The forward portion of the frame 30 is supported primarily on the squeegee roller 36, which is rotatively mounted in the vacuum nozzle 37 adjacent the axial center thereof. This roller and vacuum nozzle in turn are adjustably supported on the frame through various bracket members 38 and transversely extending bars 39 and 40 details of which construction and adjustment will be explained as the description proceeds.

The working parts per se include the motor 41, the drive shaft 42 of which carries and rotates the vacuum fan 43, cooling and airproducing blower fan 44 and is in gear drive connection at the point 45 with the mechanism which drives the rotating brush. The rear housing of the motor is provided with a tubular conduit 47, which furnishes air to the foam generating mechanism. Thus, motor 41 is utilized for vacuum suction, as a blower for mixing air with the detergent and as means for driving the brush. The vacuum portion is connected to the vacuum nozzle 37 through duct 49 which leads into the housing for the vacuum blade 43 and then out through duct 50 to a cyclone type separator 51. These component parts are clearly illustrated in FIGURES 2, 3 and 4 of the drawings, and by referring to these figures, it can be seen that detergent is induced into the foam generating mechanism 48 through a series of tubes connected through a solenoid valve 55, and coupling 56 which receives the detergent from the detergent containing tank 57 detachably mounted to the handle 31. Air is then delivered by the blower blades 44 to the motor and over the motor, cooling the same and slightly heating the air as it is fed to the foam generating mechanism. The air spreads throughout the entire housing of the foam forming mechanism and the detergent is fed to the housing through an elongated perforated tube 58. The air then strikes the detergent adjacent the detergent distribution tube 58 through a venturi 59 which increases the velocity of the air and causes the detergent flowing out of the holes in the tube to atomize or more properly turn into a spray. This spray is then carried by the air toward a perforated material in the nature of a screen 60 which is secured adjacent the bottom of the housing and which covers a series of longitudinally extending apertures 61, better shown in FIGURE 18 of the drawings. This perforated screen material covering the apertures 61 causes a multitude of small, uniform bubbles to form and as the air continues to flow through this creates an even foam, which is delivered to the top of the rotating brush. It should be noted that the brush rotates in the direction of the travel of the machine and thus the foam is delivered downward in front of the machine and onto the carpet as the brush scrubs and works the pile, and the foam is forced deep into the pile, picks up the dirt and then is delivered by the brush toward the vacuum nozzle 37. A stripper bar 62 is formed on the forward portion of the vacuum nozzle 37 and is mounted between the brush and the squeegee roller 36. The function of this bar is to prevent the brush from picking up the end of the carpet and also isolates the brush from the vacuum nozzle keeping the vacuum from pulling the foam out of the brush before it has been used effectively on the carpet. The dirty foam is then picked up by the vacuum nozzle and moves around the squeegee roller 36 and, of course, this roller having its novel location intermediate the space of the pick up nozzle opening, allows the machine to be easily pushed over the carpet as well as acting as the aforementioned squeegee roller to squeeze the foam out of the carpet fibers and allows the foam to be picked up by the vacuum nozzle.

The negative pressure within the upper portion 70 of the vacuum housing is provided with an opening for the entrance of a defoaming agent and this defoaming agent is delivered by means of a tube 71 extending into a tank 72 carrying the defoaming agent. Intermediate the tube adjacent the top of the tank 72 is an air bleed or snifter valve 73, the purpose of which is to prevent a siphoning effect on the defoaming agent. This valve will be described in detail later on in the specification. The defoaming agent, therefore, is induced into the dirty foam as it is picked up from the carpet and is thoroughly mixed therewith and reduces the foam to a liquid. This liquid is, of course, thoroughly mixed with air and as it is delivered to the cyclone separator 51 the liquid and air will separate in a novel manner and the liquid drops into the dirty liquid tank 74, where it can be removed from the machine when the tank is full.

The brush 46 is enclosed within a housing the front and side walls of which are formed by the forward portion of the ornamental unitary frame 30, and the rear wall is in the form of a sheet plate 80 and this housing aids in keeping the foam in direct contact with the carpet since only the bottom of the housing is open and prevents the other working parts of the machine from coming in contact with the foam. The rear wall of plate 80 is in the nature of a splash shield and adjacent one side thereof (see FIGS. 2 and 14 of the drawings) is provided with an aperture of a size and configuration to receive the drive belt 81. Belt 81 is, of course, trained about the drive pulley 82 which is driven through the differential 83 by the motor shaft 42. The other end of the drive belt 81 is trained over the brush drive wheel which is rotatively secured to a bearing and stub axle arrangement 85, which is in turn carried by the inner wall of the unitary frame 30. The inner surface of the brush drive wheel 84 carries a series of pins 86 which protrude from the inner surface of the wheel and the brush end is provided with aligned holes which will engage the pins 86 and in this manner when the brush is in the position shown in FIGURE 14 of the drawings, the same will be driven in the direction of movement of the movement of the machine. On the other side of the machine means is provided whereby the brush can be quickly disengaged and removed from its housing. In this regard, attention should be directed to FIGURES 14 and 19 of the drawings, wherein a nylon spool 87 is mounted to a stub axle 87' rotatively carried by the unitary frame 30. The nylon spool is free to slide on the stub axle and is held in its extended operative full line position (note FIG. 14) by means of a slide plate 88 which is in turn provided with an elongated slot so that it can be moved from its full line position FIGURE 14 to a released dotted line position where the spool will then be free to slide inwardly to give the brush movement away from pins 86. To support the spool in its operative position I provide a small housing 89 which is welded or otherwise secured to the inner wall of the unitary frame 30 and provides a wall slightly spaced from and parallel therewith. This wall is provided with a large opening 90 and plate 88 is of a size and configuration to snugly engage between the inner surface of the unitary frame and the outer wall portions of the housing 89 and is also provided with a nipple type latch means 91 which extends through a small aperture formed in the side wall of the frame 30. Thus, to secure the brush in place, it is merely necessary to tilt the brush slightly and pull the slide plate 88 downward to its dotted line position so that the spool can be moved inwardly, place the end of the brush on the spool and swing it onto the housing so that the three holes are aligned with the drive pins, and then push the slide plate 88 back into its locked position where it will cam or move the spool to its full line position shown in FIGURE 14 of the drawings. In other words, the brush must be placed on the support, spool end first. This camming action is of course due to the inclined wall 92 of slide plate 88. The brush is now firmly locked in position and ready for operation. On the top wall of the brush housing, I provide an elongated opening of a size and configuration to receive the lower sloping walls of the housing for the foam generating mechanism and unit 48. In order to provide a seal, a bushing 93 is utilized and the aperture is such that the lower elongated slots or apertures 61 are below and well within the brush housing so that foam when generated will be deposited directly on the upper surface of the rotating brush.

Figure 14:
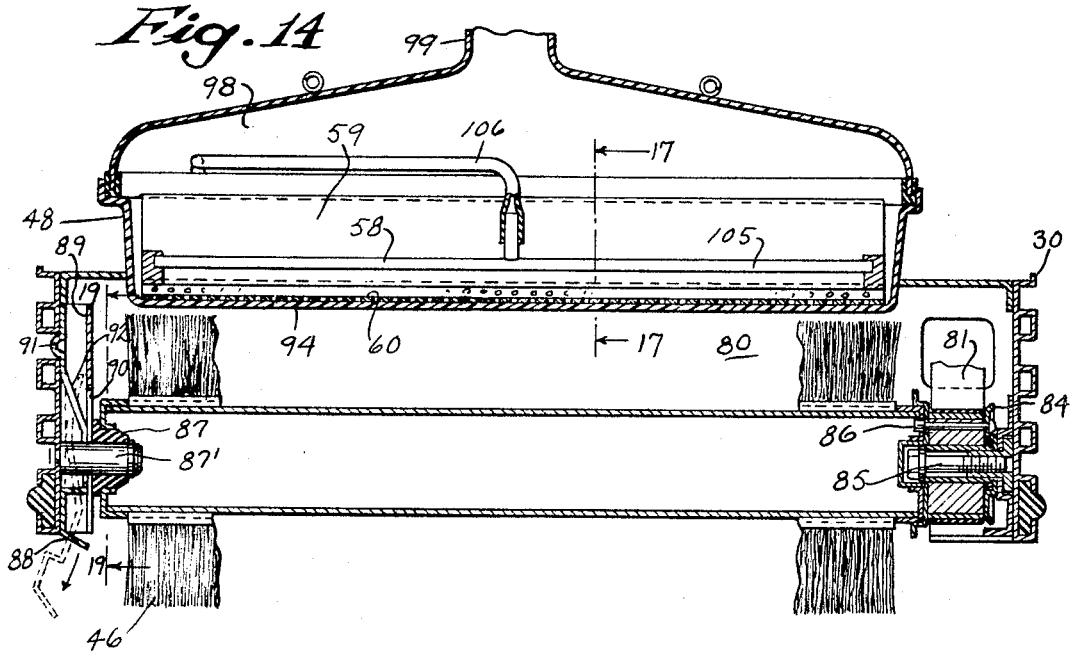
FIGURE 14 is a vertical transverse section through the forward part of the machine, the section being taken on the line 14—14 of FIGURE 4, looking in the direction of the arrows and illustrating particularly the novel drive and adjustable mounting means for the brush, as well as details in the foam generating mechanism.

The specific structure of the foam generating unit 48 is best illustrated in FIGURES 4, 14 and 17 of the drawings, and it can be seen that the same includes the lower housing portion having diverging walls, a closed bottom wall 94, the venturi 59 which preferably is in the form of two opposed plates secured adjacent their lower end terminations to suitable blocks 95. The upper portion of each of the plates forming the venturi 59 are provided with lips which rest upon the peripheral ledge 96 of the foam generating unit housing. The upper portion of this foam generating housing is closed by a hood the lower end of which is sealed by a suitable rubber sealing means 97, and this hood 98 carries a central entrance throat 99 to which is coupled the tube or hose 47 leading to the blower end of the motor. This foam generating unit 48 can be properly placed in the aperture atop the brushing housing and to aid in supporting the same in an upright position, inclined brackets 100 are provided which engage the under surface of ledge 96 and a pair of spring holding members carrying hooks which can be readily engaged and disengaged from the upstanding lips 101 further aid in firmly securing the unit to the machine. Thus, when it is desired to clean this unit or repair the same, it is merely necessary to disengage the spring hooks from the lips 101 and lift the entire unit from the top of the brush housing. As previously brought out, the forward wall of the foam generating unit is provided with a series of equi-distantly spaced elongated slots 61 and these are covered by a fine screen material which is furnished in the form of a sheet and can be bent as shown in FIGURE 17 of the drawings and firmly riveted or otherwise secured in lace. Within the venturi 59, extending transversely across the machine is the detergent dispersing pipe 105 and this pipe is provided with a series of small holes throughout its entire length so that the detergent will be spread evenly within the venturi throat and mixed with the air as the air moves the detergent toward the screen like material, the velocity of the air mixing with the detergent spray will further break up the detergent to form bubbles and an even, uniform foam. The detergent is fed to the pipe 105 through the tubing 106 which is in open communication with the nipple centrally located on the pipe. Tube 106 is also in open communication with the electric solenoid valve 55 which controls the flow of detergent and which is in direct connection through tubing to the quick coupling member 56 located on the panel of the bracket and panel support 32. The detergent itself is carried in the novel detergent tank 57 and is fed by gravity through tubing 107 to the female end 108 of the quick coupling member 56.

Figure 10:
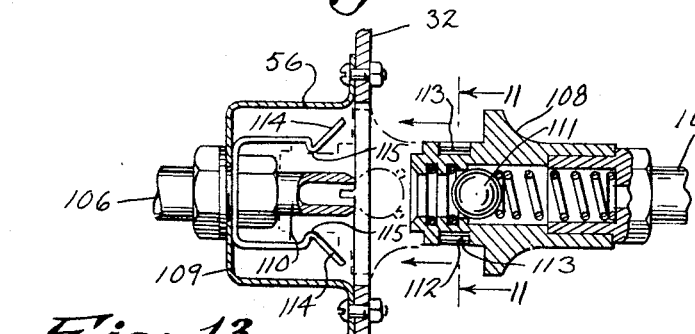
FIGURE 10 is a fragmentary longitudinal section through the novel coupling means located on the bracket panel of the machine for attaching and detaching the tube leading from the detergent tank.
Figure 11:
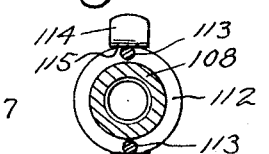
FIGURE 11 is a transverse vertical section through the coupling, the view being represented by the line 11—11 in FIGURE 10 of the drawings, and looking in the direction of the arrows.
Figure 12:
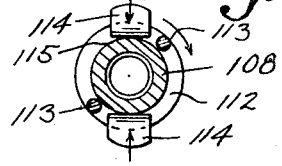
FIGURE 12 is a section similar to FIGURE 11 of the drawings, but showing the coupling in its closed operative position.

The quick coupling member will now be described in detail and is best illustrated in FIGURE 10 of the drawings. As stated the male portion of the quick coupling member 56 is carried by the panel 32' of the rear bracket and panel unit 32 by means of a bracket member 109 to which the male coupling member 110 and tubing 106 are secured. The female portion 108 includes a spring held ball valve 111 which is normally urged in its closed position as shown in full lines in FIGURE 10, but which is unseated by the projecting male member 110 of the coupling when the female portion 108 is its fully locked, dotted line position FIGURE 10. To facilitate the quick coupling and uncoupling of the unit the housing of the female portion of the coupling 108 adjacent its outer end termination is provided with a peripheral groove 112 and in opposed spaced relation one to the other across this groove a pair of pins or cams 113 are secured and the outer surfaces of these pins are in alignment with the upper surface of the walls forming the groove. Secured to the bracket 109 are a pair of spring fingers 114 and these spring fingers are provided with inwardly directed latch points 115 which normally will spring into and engage within the groove 112 to firmly hold the male and female portion of the coupling together. Thus, to join the coupling it is merely necessary to turn the pins 113 out of alignment with the spring fingers 114 and push the coupling together until the latch points 115 rest within the groove as shown in FIGURE 12. To disengage the coupling it is merely necessary to rotate the female portion 108 so that the pins ride under the latch points 115 of the spring fingers 114 and spread the same as shown in FIGURE 11 whereby the female portion 108 of the coupling can be quickly and easily withdrawn. Obviously, with the coupling in its locked operative position, detergent will flow by gravity through tubing 107, through the coupling, through tubing 106 to the solenoid valve, which when open will allow the fluid to progress to the detergent distribution tube 105.

Attention is now directed to FIGURES 1 and 5 of the drawings, wherein the handle construction, power control means and the mounting of the detergent tank are clearly illustrated. As shown, the handle 31 is preferably constructed of tubular stock to include identically shaped side bars 116 and 117, which are flattened adjacent their lower ends and received in suitable slots formed in the upper wall of the rear portion of the unitary frame 30. The bars are joined at their upper ends by a housing 118 which includes the switches 119 and to which are secured usual hand grips 120. Adjacent the point where the side bars 116 and 117 are bent inwardly, a cross brace 121 is provided and the bars then continue in a substantially parallel relation and then diverge adjacent the top portion where they join the housing 118. Thus, it can be seen that the handle unit 31 can be quickly and easily removed from the machine and this is accomplished by providing motor is on and air is being blown into the venturi portion- latching members 122 secured to the inner portion of the rear portions of the frame 30 and which cooperate with the inwardly directed hooks 123 affixed adjacent the upper end of the flat extensions 124. As shown, these extensions are further braced on the axle hub housing 125 for the rear rollers 34 and the latch members 122 are of the conventional type including the adjustable hook 126 which is pivoted off center to the lever 127. Thus when the lever 127 is pulled down, as shown on the right hand side of the drawing FIGURE 5, the hook 126 is lifted upwardly and disengaged from the handle latch hook 123. When the lever is pivoted upward as shown in section on the left side of the drawing, then the particular leg of the handle is firmly latched and secured in place.

Electrical current is furnished to the machine through a wire 128 which may be connected to any type of commercial plug (not shown). The wiring within the housing 118 is rather conventional and therefore has not been illustrated in detail, but it is important to note that two switches are provided. One switch is the aforementioned switch 119 for the motor and the other switch 119' is provided to operate the solenoid valve 55 which controls the flow of detergent to the foam generating mechanism. This valve is normally in a closed position, so that no detergent is fed to the foam generating mechanism. The wiring is such that switch 119' controlling the solenoid valve cannot be actuated unless the motor switch 119 is on, but once the motor switch 119 is turned on, then the detergent switch 119' can be independently actuated and thus if too much foam is produced at any particular time, the switch 119' may be turned off and solenoid valve will close to stop the further flow of detergent to the foam generator. From this wiring arrangement, it is apparent that no foam can be generated unless the motor is running, and no detergent can be fed to the foam generating mechanism to clog or overflow the same, unless the motor is on and air is being blown into the venturi portion of the foam generating mechanism. Electrical current for actuating the motor and solenoid valve extends out of the housing 118 and through wire 130 which is connected to a detachable plug on the panel, as shown.

Figure 13:
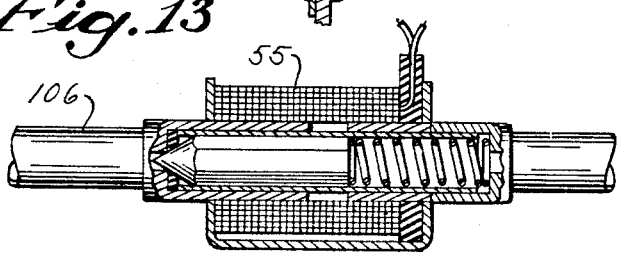
FIGURE 13 is an enlarged longitudinal fragmentary section through the solenoid valve utilized to regulate the flow of the detergent from the detergent tank to the novel foam generating mechanism.

Attention is now directed to FIGURE 13 of the drawings, which shows the details of the solenoid valve 55. Current to excite the valve is by means of the wires 130' and the valve normally is in a closed position with the valve stem 131 closing off the orifice 132 so that no detergent is fed to the defoaming unit. The main body of the valve stem 131 is provided with flat surfaces and may be, for example, octagonal in cross-section, while the valve bore 133 is tubular in shape, and thus the detergent will flow about the valve stem when the stem is unseated. The stem is urged in its closed position as shown, by means of the spring 134 and when excited by turning on switch 119 the valve stem is retracted and detergent then will continue to flow to the foam generating unit.

Detergent tank 57 is preferably molded in two sections, which are joined to form a peripheral lip 135, note FIGURES 1 and 5, and is of a size and configuration so that peripheral lip 135 overlies the parallel side sections of the side bars 116 and 117 and rests upon a support bar 136 secured to the cross-brace bar 121. Support bar 136 is preferably formed with an angular flat inner surface of a size and configuration to allow the lower peripheral edge that the detergent tank can be readily placed in position between the bars 116 and 117 and the peripheral lip 135 and its lower portion 137 will prevent the tank from dropping through the opening formed by the side bars 116 and 117 and the support 136 secured to cross-bar 121 prevents the downward movement of the tank. In order to firmly secure and lock the detergent tank 57 in place, a spring type rotating clamp 140 is provided and this clamp is so constructed and arranged that a stretch 141 thereof will overlie the upper edge portion of the peripheral lip or rim 135. It should be noted that this spring clamp is bent from a single length of spring wire so that its end terminations are pivotally carried at 142 by the respective portions of the side bars 116 and 117. They are then bent in a U-shape (note FIGURE 1) to straddle lip 135 and provide the stretch portion 141 which engages over the top of the lip or rim. Thus, when the spring latch is in its full line position of FIGURES 1 and 5, the upward movement of the detergent tank is prevented both by the stretch 141 and formation of the cross support 136. To remove the detergent tank it is merely necessary to pivot the spring latch member from its full line position in the direction of the arrows to its dotted line position, FIGURE 1, and then to lift detergent tank 57 upwardly and outwardly from its operative position. To fill the tank an opening 143 adjacent the upper end is provided as shown.

The structural details in the cyclone separator 51 and means for mounting the dirty liquid tank 74 will now be set forth. It should be noted that the unitary ornamental frame 30 is provided with a cross frame member 148 which along with structural members 38 and cross bars 39 and 40 aid in supporting the various working parts of the machine. The function of the bars 39 and 40 will be better understood when the description of the mounting of the vacuum nozzle and squeegee roller is set forth. It should be noted however that the cyclone separator 51 is formed as a solid, unitary piece to provide a central opening 149 (note FIGS. 3 and 4), the conical walls 150 and passageway 151 open at its lower end 152 above the dirty liquid tank 74. The outer end termination of the cyclone separator unit cooperates with a support ring or rim to provide an inverted U-shaped channel 153 and the upper open periphery of the dirty liquid tank 74 is formed so that its rim 154 will fit within the U-shaped channel 153 and provide a relatively close fit and seal. One end of the cyclone separator 51 is provided with an enlarged entrance throat 155 which is connected to the duct or tube 50 in communication with the vacuum nozzle. Thus as the dirty foam is lifted from the carpet it proceeds through the vacuum nozzle, the duct 50 and into the passageway 151 of the cyclone separator in a whirling action in the direction of the arrows FIGURE 3, where the air is separated from the heavier liquid and the liquid will drop into the dirty liquid tank 74. The open portion 149 of the cyclone separator is in open communication with the atmosphere and thus allows the air separated from the liquid to escape and the pressures to be equalized with the atmosphere. When the dirty liquid tank becomes filled, it is then merely necessary to empty the same, and this is done by removing the tank through the rear of the machine between the side bars 116 and 117 of the handle. The mounting of the dirty liquid tank is accomplished in a novel manner and for this purpose an angle shaped member 156 is provided which is secured to a vertical upright of the machine frame which cooperates with a U-shaped holding bar which, in turn, engages under the two sides and one end of the peripheral lip 154. This holding bar 157 is pivoted to the rear brace members 32 as indicated by the reference numeral 158 and has a bent portion received in a slot formed for that purpose. Thus it can be seen that the holding bar 157 can move from a holding, full line position FIGURE 4, to a released dotted line position where the dirty liquid tank can be slid out of the machine as indicated by the dotted lines. This allows the upper peripheral lip to disengage from the inverted U-shaped channel 153 and to move freely from the machine. To replace the tank it is necessary to engage the holding bar under the sides of the upper pheripheral edge of the tank, slide the tank inwardly and then move the holding bar upward to its full line position, where the tank will be held firmly in place and sealed within the channel. To accomplish the movement of the holding bar from its operative position to its lower released position, I secure to the side legs of the bar a pair of vertically opposed members 160 and these members 160 when moved up or down, will cause the bar to be raised or lowered correspondingly. The upper end of each member 160 is provided with an elongated slot 161 and extending into each of the elongated slots in a projecting nib 162 carried by the bail like member 163. The inner ends of the bail like member are turned outwardly and pivotally secured to the frame portion of the machine by L-shaped brackets 164. The bail can be moved by turning the knob 165 mounted on the panel and the knob carries an inwardly directed crank 166. A portion of the crank 166 engages under the rear stretch 167 of the bail and over a piece 168 welded or otherwise secured to the under portion of stretch 167 to provide a slot through which the crank end 166 may extend. Thus, it can be seen that by turning the clamp knob 165 the bail through crank 166 will be raised and lowered, and thus in turn raises and lowers the entire holding rod 158 to either clamp the dirty liquid tank 74 in its operative full line position, or release the same by lowering it to the dotted line position shown more clearly in FIGURE 4 of the drawings. The cross brace member 148 under the dirty liquid tank 174 is provided with means to carry the defoamer tank. The tank, of course, is independent of the cross brace and not supported directly thereby. The tank generally remains in position. Access to the filling opening for this defoamer tank can be had by simply removing the dirty liquid tank 74 as previously described, and unscrewing the cap 170 and pouring in the solution. The cap for the tank is then replaced and when the machine is running, due to the negative pressure in the vacuum throat, the deforming liquid will be injected into the defoamer as it is drawn through the vacuum unit. The amount of defoaming solution which enters the vacuum nozzle is regulated in direct proportion to the quantity of foam being picked up by the nozzle. This is accomplished through the air bleed or snifter valve 73 and by referring to FIGURES 7 and 8 of the drawings, it can be seen that this valve 73 is provided with a small tube 171 which extends into and terminates adjacent the bottom of the deforming tank 72. This tube 171 through the air bleed valve 73 is in open communication with tube 71 leading to the vacuum nozzle. The valve body 73 is also provided with an air bleed hole 172 which communicates with the inner chamber 173 of the valve body and air thus may enter into the valve body in accordance with the regulation of an adjusting screw 174 carrying the needle valve end 175. The adjusting screw 174 is threadedly received as shown, and to aid in this fine adjustment a spring 176 is interposed under the head of the nut 177 and the wall 178 of the valve body. Thus the amount of air which is allowed to enter the chamber 173 can be easily regulated and controlled by turning the screw 174 in one direction or other. It should be noted that the air bleed valve can be adjusted to a point where no flow of defoamer occurs, unless the nozzle opening in the vacuum unit is restriced by the foam being picked up, causing an increase of vacuum within the nozzle. As the quantity of foam being picked up by the nozzle increases the flow of defoamer will likewise increase. Due to the proper adjustment of the air bleed valve, no siphoning effect will result.

To put it another way, the rate of flow of the defoamer is controlled by the air bleed valve 73 and the vacuum in the pick up nozzle. This results in an automatic feed of defoamer into the vacuum nozzle where it is mixed with the foam and through a chemical reaction results in defoaming and turning the foam into a liquid where it is further forced into the cyclone separator.

The height of the rotating brush 46 in relation to the carpet can be adjusted by adjusting the vacuum nozzle and squeegee roller 36, since the machine is supported primarily on the rear rollers 34 and the vacuum unit which, of course, includes the squeegee roller 36. Thus, by moving the vacuum nozzle and squeegee roller 36 in a downward direction, the frame will automatically be moved upwardly at the front end and pressure of the brush on the carpet will be relieved somewhat. Moving the vacuum unit upwardly within the frame actually allows the frame to lower and more pressure will be put upon the brush, causing it to move more deeply into the pile.

Figure 9:
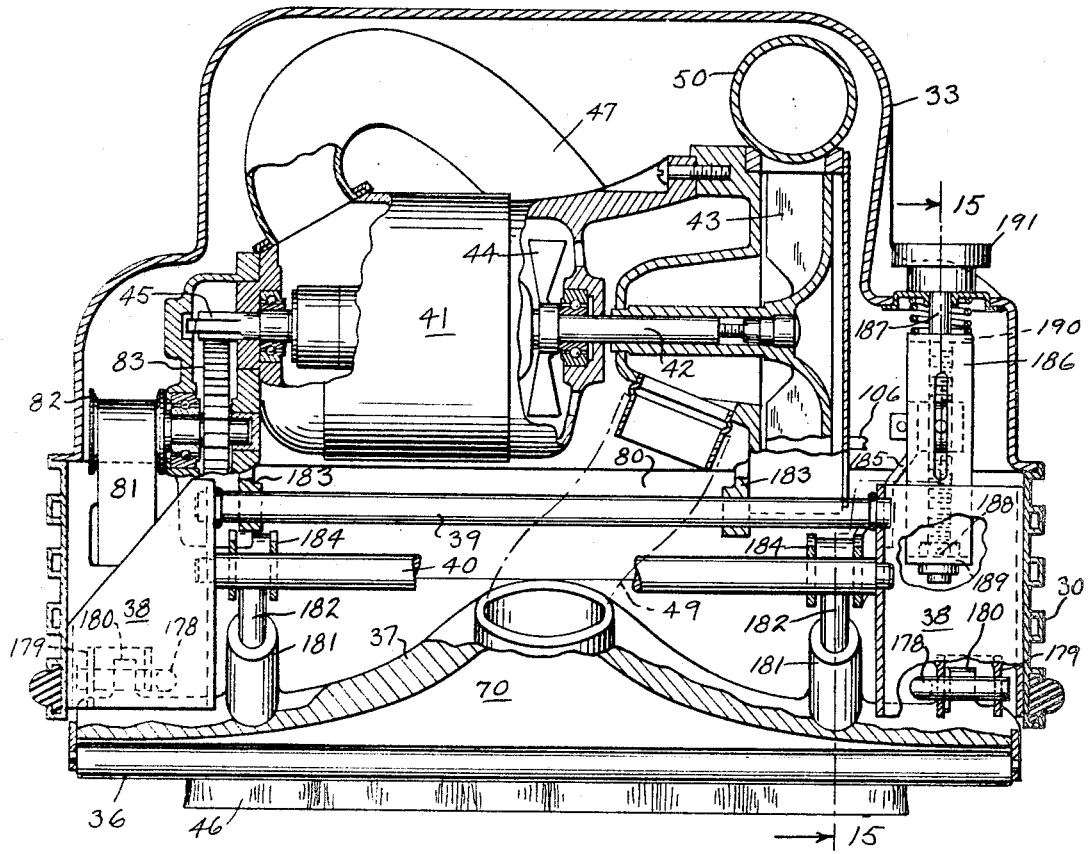
FIGURE 9 is a vertical transverse section taken on the line 9—9 of FIGURE 4 of the drawings, and looking in the direction of the arrows, namely toward the forward portion of the machine with other parts being broken away and in section to illustrate further details in its construction.
Figure 15:
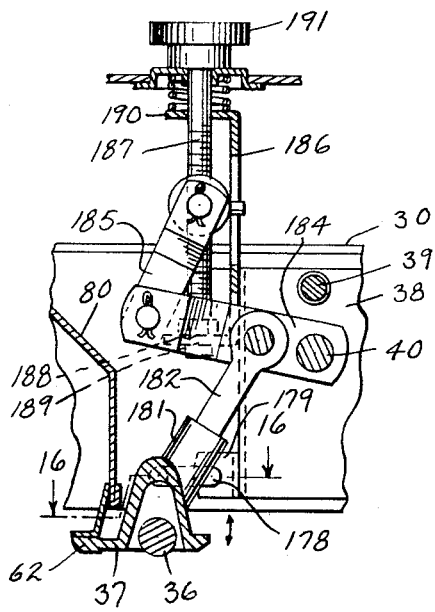
FIGURE 15 is a vertical fragmentary section through the adjustable means for the vacuum nozzle and squeegee device, the section being represented by the line 15—15 of FIGURE 9 of the drawings.
Figure 16:
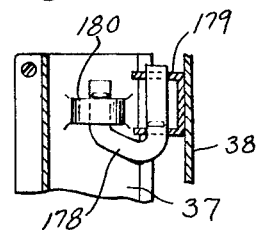
FIGURE 16 is a fragmentary horizontal section taken on the line 16—16 of FIGURE 15 of the drawings, and looking in the direction of the arrows.

For this purpose, the vacuum unit 37 and squeegee roller 36 are pivotally mounted to the frame by substantially U-shaped pivot members 178. One leg of each member is pivotally secured through the spaced ears 179 (note FIGS. 9, 15 and 16 of the drawings). The other leg of each member pivotally carries at 180 the respective end of the vacuum nozzle unit. Thus, it can be seen from the description so far that the vacuum nozzle unit can be readily moved up and down in relation to the frame through members 178. To hold the vacuum unit in its adjusted position and to provide a fine adjustment inwardly of the pivot members 178, the housing of the unit is provided with a pair of spaced rearwardly extending barrel support members 181 to receive the respective ends of the pivoted link members 182. In any event, the link members are rigidly secured to the barrel members 181. Extending transversely across the machine are the aforementioned bars 39 and 40 and these bars are carried by the brace members 38. Bar 39 forms a support for the motor and gear housing portions of the machine. Note support members 183 FIGURE 9, for this purpose. In any event, bar 40 has pivotally secured at each end thereof a lever member 184, which in turn pivotally carries the link 182. On one side of the machine, lever member 184 is extended and pivotally carries member 185. Supported on the machine by means of bracket 186 is a threaded shaft 187 which is journaled at one end 188 to an inwardly directed leg 189 of the bracket and is supported at its upper end to an upper inwardly directed leg 190. Thus, by turning the knob 191 shaft 187 can be rotated. Shaft 187 in turn carries a travelling nut 192 to which is pivotally secured the other end of member 185. The travelling nut is provided with a radially extending guide pin 193 which travels in an elongated slot 194 formed in the vertical wall of the aforementioned bracket 186. Thus, it can be seen that the turning of the knob 191 will cause the travelling nut to move up or down on the threaded shaft 187. This, in turn, causes the lever members 184 and 185 to pivot and move link 182 up or down and since the link is firmly secured to the barrel 181 of the vacuum housing unit the vacuum housing carrying the squeegee roller 36 will likewise move up and down and thus adjust the weight or pressure placed on the brush 46.

The structure of the bristles of the brush 46 can be of any desired standard form and preferably, soft nylon bristles are utilized. For the purpose of illustration, attention is directed to FIGURE 20 of the drawings, wherein an enlarged fragmentary view of one way of securing the bristles to the core of the brush is shown, and in this form I have illustrated transverse strips fitted into dovetail slots formed in the core, but as mentioned, obviously these strips 200 could be eliminated and the brush bristles secured evenly at their base to the brush core.

While the various component parts of the novel dry foam type carpet shampooing machine have each been described somewhat in detail, it is very interesting how these different parts and units of the machine mesh together to form a complete machine unit of a single purpose, the principle of which is completely unique in the science of carpet cleaning. To repeat briefly, air and detergent are mixed under pressure to generate dry foam. The foam spreads just ahead of the shampoo brush due to the direction of rotation of the brush. And due to the fact that the foam is deposited adjacent the top of the brush it then cleans to the bottom of the pile. While the dirt is held suspended in the foam, it is all extracted through the means of the vacuum unit and squeegee roller and directed into a separate dirty liquid tank. All this is accomplished in one fast operation leaving the pile clean to the base and hardly damp.

To operate the machine for effectively cleaning the carpet, therefore, it is only necessary to place the machine at one end or edge of the carpet, fill the defoamer tank and detergent tank with the correct solutions, adjust the brush 46 to a raised position and lock the dirty liquid tank in its operative position. The control switch for both the motor and detergent, should now be switched on and the machine should be allowed to run a very short time until foam appears and begins to accumulate in front of the machine. The machine is then pushed slowly across the carpet at approximately a rate of twelve feet per minute. The correct speed will of course vary from job to job, depending on the nature of the rug. Care should be taken to make sure that the machine is not pushed too fast so that a shortage of foam results. This would have an immediate effect in causing uneven cleaning of the carpet. There should be a visible amount of foam ahead of the brush at all times. If, however, a surplus of foam accumulates in front of the machine, it is only necessary to turn off the foam control switch as previously described and continue. After the machine has used this excess foam, the detergent switch 191' can again be turned on and thus the foam can be easily controlled. When the machine is close to the other end of the carpet the detergent switch should again be turned off to allow the machine to use up the remaining foam. This procedure is repeated until the entire carpet area is cleaned.

Thus while I have shown and described certain specific embodiments of my invention, it will be understood that these embodiments are merely for the purpose of illustration and description, that various other forms may be devised and that changes may be made in the proportions, minor details of construction etc. without departing from the spirit of the invention or scope of the appended claims.

What is claimed as new is:

1. A dry foam carpet shampooing machine comprising, a unitary lower ornamental frame of a generally U-shape configuration to provide a closed front and sides and an open rear end, roller supporting means rotatively carried by said frame adjacent the rear end thereof, a cross brace member extending transversely across said frame intermediate its front and rear ends, means including said frame and cross brace member for carrying and supporting the various component parts of said machine, a motor carried by said supporting means adjacent the forward portion of said frame, a driven shaft for said motor extending longitudinally through the motor and having both its end terminations projecting beyond the motor ends, said motor having, a vacuum suction fan on said shaft adjacent one end termination, a blower fan secured intermediate its ends, and a drive means on the opposite end of said shaft, a carpet engaging rotating brush extending transversely across the front of the machine within said frame, means for driving said brush in drive connection with said motor shaft drive means, a foam generating mechanism carried above said brush and extending transversely therewith, a conduit communicating with the motor blower fan and said foam producing mechanism, means for inducing a detergent to said foam generating mechanism, a vacuum nozzle extending transversely of said frame adjacent and behind said brush, a squeegee roller carried within said vacuum nozzle and spaced from the peripheral edges thereof, said squeegee roller forming a support for the forward portion of said machine, said vacuum nozzle being formed with a stripper bar at its forward end adjacent and between said rotating brush and said squeegee roller, means connecting said vacuum nozzle with said suction fan, means for inducing a defoaming agent into said vacuum nozzle above said squeegee roller, a cyclone separator carried by said frame supporting means adjacent the rear portion of the machine at the upper end thereof, duct means communicating with one end of said suction fan and said cyclone separator, a dirty liquid tank carried immediately below said cyclone separator and in communication with the lower open end thereof, means for releasably carrying said tank in said machine, an angularly extending upright brace member secured adjacent the rear of said unitary frame to provide side support members and a rear upper transversely extending panel, a handle for manipulating said machine, means for releasably securing said handle to said frame adjacent the rear end thereof, said handle carrying a detergent tank, means for detachably securing said tank to said handle, coupling means carried by said panel for said detergent and source of electrical current, a defoaming agent tank carried by said frame immediately below said dirty liquid tank, valve means for regulating the flow of defoaming agent to said vacuum nozzle, means within said detergent lines for shutting off the flow of detergent to said foam generating mechanism, and means for adjusting the height of the rotating brush in relation to the carpet.

2. A dry foam carpet shampooing machine comprising a unitary lower ornamental frame of a general U-shape configuration to provide a closed front and sides and open rear end, a cross brace member intermediate the ends of said frame and means associated with said frame for supporting and carrying the various component parts of said machine, roller supporting means rotatively carried by said frame adjacent the rear end thereof, a rotary brush carried by said frame adjacent the forward end thereof, said brush adapted to rotate in the direction of travel of the machine, an elongated foam generating unit carried above and extending longitudinally with said brush, said foam generating unit including means for mixing a liquid detergent and air along the length of said unit and for depositing an even uniform dry foam on top of said brush and in front of said machine, a vacuum nozzle extending transversely across the machine immediately to the rear of said brush, a squeegee roller journaled within the vacuum nozzle throat and forming a roller support for the forward portion of the machine, means for inducing a defoaming agent into said vacuum nozzle, an electric motor providing means for creating the vacuum forcing the air into the foam generating mechanism and driving said brush, a cyclone separator into which the dirty liquid is forced, a dirty liquid tank below said cyclone separator, and means for completing a circuit with a source of power and said motor.

3. A machine as set forth in claim 1, wherein said foam generating mechanism includes a transversely extending housing defining a closed bottom wall and diverging rear and forward walls, said forward wall adjacent the lower end thereof being provided with a number of spaced elongated slots, a fine screen like material secured to said lower wall and having a length extending over said slots, a Venturi within said housing extending the entire length thereof, a tube within said Venturi having its ends sealed to the side walls thereof and being provided with a series of spaced relatively small apertures of a size and configuration to allow detergent to be evenly spread within the venturi throat, means connecting said tube with a source of supply for said detergent, a hood for said housing completely sealing the same and having a duct in communication with the source of air under pressure, whereby the increased velocity of the air in the venutri throat will break up the detergent into a fine spray and in further moving through said screen like material will make a uniform dry foam and deposit the same evenly on the upper surface of the brush.

4. A machine as set forth in claim 1, wherein said tubing for said defoaming agent is provided with an air bleed valve and includes a vertical length extending into said defoaming agent tank, a valve housing and tubing connected to said valve housing and said vacuum nozzle, said housing also being provided with an opening to the atmosphere, and a needle valve opening and closing said opening to regulate the amount of air entering said valve housing, whereby the amount of defoaming agent due to the negative pressures in the vacuum nozzle may be regulated by the positive pressures in the atmosphere.

5. A dry foam carpet shampooing machine comprising a frame having a closed front and opposite sides, roller supporting means rotatively carried by said frame adjacent the rear end thereof, a rotary brush carried by said frame adjacent the forward end thereof, said brush adapted to rotate about a horizontal axis and transversely in the direction of travel of the machine, an elongated foam generating manifold carried generally above and extending longitudinally with said brush, said foam generating manifold including means for mixing a liquid detergent and air in and along the length of said elongated manifold and for depositing an even uniform dry foam generally on top of said brush, air supply means for said foam generating means, a vacuum nozzle extending transversely across the machine and parallel to said brush, said nozzle located closely adjacent the carpet being cleaned for picking up dirty detergent from said carpet, a squeegee roller journalled adjacent the vacuum nozzle and forming a roller support for the forward portion of the machine; an electric motor providing means for (1) creating the vacuum for said nozzle, (2) forcing the air from said air supply means into the foam generating mechanism and (3) driving said brush; and a container into which the dirty liquid is conducted from said nozzle.

6. The machine as defined in claim 5 further characterized in that said roller supporting means extends substantially across the entire width of the machine.

7. The machine as defined in claim 6 further characterized in that said roller supporting means comprises a plurality of rollers.

8. A dry foam carpet shampooing machine comprising a frame having a closed front and opposite sides, roller supporting means rotatively carried by said frame adjacent the rear end thereof, a rotary brush carried by said frame adjacent the forward end thereof, said brush adapted to rotate about a horizontal axis and transversely in respect to the direction of travel of the machine, an elongated foam generating manifold extending longitudinally along said brush and adjacent the upper forward side thereof, said foam generating means including means for mixing a liquid detergent and air and for depositing an even uniform dry foam generally on top of said brush, a liquid detergent tank having tube means for conducting detergent along the length of said manifold, a vacuum nozzle extending transversely across the machine adjacent said brush and parallel thereto, said nozzle located closely adjacent the carpet being cleaned for picking up dirty detergent from said carpet, a collection tank for said dirty detergent, a squeegee roller journalled adjacent the vacuum nozzle and for rolling on the carpet being cleaned to thereby squeeze dirty solution from the carpet for being sucked up by said nozzle; an electric motor including a drive shaft, an air blower fan mounted on said shaft and having a conduit for delivering air to said foam generating manifold, whereby air and detergent are mixed along the length of said manifold, a vacuum impeller mounted on said shaft and having conduit means connected to said nozzle, and to said collection tank for sucking dirty solution from the carpet being cleaned and into said collection tank, and drive means between said motor and said brush for rotating the latter.

9. The machine set forth in claim 8 further characterized in that said squeegee roller forms a rolling support for the front portion of said machine.

10. The machine described in claim 8 including a housing having an open bottom and in which said brush is mounted whereby the foam is kept in direct contact with the carpet being cleaned, and said manifold is mounted on said housing.

11. The machine described in claim 8 further characterized in that said manifold has Venturi means therein for thoroughly mixing said detergent and air to produce a uniform foam for deposit on said brush.

12. The machine set out in claim 8 including solenoid operated control valve means for regulating flow of detergent to said foam generating manifold.

References Cited

UNITED STATES PATENTS

| | | | |
|---|---|---|---|
| 1,801,135 | 4/1931 | Blogg | 15—320 |
| 2,910,720 | 11/1959 | Smith | 15—320 |
| 2,993,223 | 7/1961 | Krammes | 15—320 |
| 3,065,489 | 11/1962 | Wright | 15—353 |
| 3,258,803 | 7/1966 | Wolter et al. | 15—320 XR |
| 3,346,896 | 10/1967 | Arones. | |

FOREIGN PATENTS 475,224  11/1937  Great Britain.

ROBERT W. MICHELL, *Primary Examiner.*